(12) United States Patent
Wang (10) Patent No.: US 10,976,883 B2
(45) Date of Patent: Apr. 13, 2021

(54) TOUCH SUBSTRATE AND TOUCH DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventor: Benlian Wang, Beijing (CN)

(73) Assignees: CHENGDU BOE OPTELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/561,653

(22) Filed: Sep. 5, 2019

(65) Prior Publication Data

US 2020/0057532 A1    Feb. 20, 2020

Related U.S. Application Data

(63) Continuation-in-part of application No. 15/688,111, filed on Aug. 28, 2017, now Pat. No. 10,452,179.

(30) Foreign Application Priority Data

Jan. 9, 2017    (CN) .......................... 201710013485.1

(51) Int. Cl.
    *G06F 3/041*    (2006.01)
    *G06F 3/044*    (2006.01)
(52) U.S. Cl.
    CPC .......... *G06F 3/0448* (2019.05); *G06F 3/0446* (2019.05)

(58) Field of Classification Search
    CPC .... F21V 7/04; G09G 5/10; G09G 3/34; G02F 1/13; G02F 1/1335; H01L 27/12; G06F 3/045
    See application file for complete search history.

(56) References Cited

U.S. PATENT DOCUMENTS

| | | |
|---|---|---|
| 2005/0083307 A1 | 4/2005 | Aufderheide et al. |
| 2007/0236618 A1 | 10/2007 | Maag et al. |
| 2012/0105365 A1 | 5/2012 | Lin |
| 2012/0169650 A1 | 7/2012 | Chang |
| | (Continued) | |

FOREIGN PATENT DOCUMENTS

| | | |
|---|---|---|
| CN | 1867882 A | 11/2006 |
| CN | 101410778 B | 12/2012 |
| | (Continued) | |

OTHER PUBLICATIONS

First Office Action for Chinese Application No. 201710013485.1, dated Apr. 1, 2019, 7 pages.

(Continued)

*Primary Examiner* — Pegeman Karimi
(74) *Attorney, Agent, or Firm* — Brooks Kushman P.C.

(57) ABSTRACT

A touch substrate and a touch display device are provided. The touch substrate includes a plurality of electrodes, at least one of the plurality of electrodes including a plurality hollowed-out structures and a plurality body portions arranged alternately, the plurality hollowed-out structures and a plurality body portions having substantially a same shape and size.

11 Claims, 5 Drawing Sheets

(56) References Cited

U.S. PATENT DOCUMENTS

| | | | | |
|---|---|---|---|---|
| 2013/0201348 A1* | 8/2013 | Li | ............................ | G06F 3/044 348/174 |
| 2015/0077650 A1* | 3/2015 | Huang | ..................... | G06F 3/044 349/12 |
| 2015/0220179 A1* | 8/2015 | Kimura | .................... | G06F 3/044 345/174 |
| 2016/0195983 A1* | 7/2016 | Miyake | ................. | G06F 3/0412 345/174 |
| 2016/0357332 A1* | 12/2016 | Nakanishi | ........... | G06F 3/04166 |

FOREIGN PATENT DOCUMENTS

| CN | 203480458 U | 3/2014 |
|---|---|---|
| CN | 205353970 U | 6/2016 |
| CN | 105892781 A | 8/2016 |

OTHER PUBLICATIONS

Non-Final Rejection for U.S. Appl. No. 15/688,111, dated Sep. 25, 2018, 11 pages.

Final Rejection for U.S. Appl. No. 15/688,111, dated Feb. 28, 2019, 6 pages.

\* cited by examiner

TOUCH SUBSTRATE AND TOUCH DISPLAY DEVICE

CROSS-REFERENCE TO RELATED APPLICATIONS

This application is a continuation-in-part application of U.S. application Ser. No. 15/688,111 filed on Aug. 28, 2017, which claims priority to Chinese Patent Application No. 201710013485.1 filed on Jan. 9, 2017, which are incorporated herein by reference in their entireties.

TECHNICAL FIELD

The present disclosure relates to the field of display technology, and more particularly to a touch substrate and a touch display device.

BACKGROUND

As an intuitive and simple input device of a computer and other data processing equipment, touch substrates are widely used in various mobile devices. Currently, there are numerous types of touch substrate, such as a resistance-type, a capacitance-type, an optical-type that are capable of detecting a position of a single-point touch or multi-point touch.

The touch substrates implement sensing of touch positions mainly by electrode patterns formed on base substrates. Electrode patterns are generally prepared using indium tin oxide (ITO) which is a transparent conducting material. However, since the transparency of ITO is not 100%, in a light environment, regions covered with electrode patterns reflect external light, while regions not covered with electrode patterns will not reflect external light, such a difference will result in a user's visual perception of apparent electrode patterns, which adversely affects the display effect.

SUMMARY

The present disclosure provides in at least one embodiment a touch substrate and a touch display device to solve the problem that in the touch substrate regions covered with electrode patterns reflect light while regions not covered with electrode patterns do not reflect light, thus causing a visual difference and resulting in a degraded display effect.

In order to achieve the above object, embodiments of the present disclosure adopt the following technical solutions.

In a first aspect, the present disclosure provides in at least one embodiment a touch substrate, comprising a plurality of electrodes, at least one of the plurality of electrodes including a plurality hollowed-out structures and a plurality body portions arranged alternately, the plurality hollowed-out structures and a plurality body portions having substantially a same shape and size.

Optionally, the plurality hollowed-out structures and the plurality body portions have a shape including polylines.

Optionally, the plurality hollowed-out structures and the plurality body portions are extended along a same direction, the plurality hollowed-out structures and the plurality body portions have substantially a same length and width.

Optionally, the touch substrate further includes a first connection portion and a second connection portion, each body portion comprises a first end and a second end, the first connection portion connects the first end of each body portion, the second connection portions connects the second end of each body portion, and the first connection portion and the second connection portion are straight lines or polylines.

Optionally, the plurality of electrodes comprises touch driving electrodes extended along a first direction and touch sensing electrodes extended along a second direction intersecting with the first direction, body portions and hollowed-out portions in the touch driving electrodes are extended along the first direction; and body portions and hollowed-out portions in the touch sensing electrodes are extended along the second direction.

Optionally, the plurality of electrodes comprises touch driving electrodes extended along a first direction and touch sensing electrodes extended along a second direction intersecting with the first direction, body portions and hollowed-out portions in the touch driving electrodes are extended along a third direction, an angle between the third direction and the first direction is more than zero degree; and body portions and hollowed-out portions in the touch sensing electrodes are extended along a fourth direction, an angle between the fourth direction and the first direction is more than zero degree.

Optionally the third direction and the fourth direction are the same.

Optionally, the third direction and the fourth direction are different and the angle between the third direction and the first direction and the angle between the fourth direction and the first direction are substantially a same degree.

Optionally, the plurality of body portions and the plurality of hollowed-out portions have a wavy or zigzag shape.

In a second aspect, a touch display device includes a display panel and the above touch substrate.

In a third aspect, a touch substrate includes a plurality of electrodes, at least one of the plurality of electrodes having a hollowed-out structure, each of the plurality of electrodes is of a regular quadrangular structure, the hollowed-out structure includes a plurality of hollowed-out portions each being of a stripe shape and extending along a lateral side of the regular quadrangular structure, hollowed-out portions in each electrode extend along a same lateral side of the regular quadrangular structure; and a part of the plurality of electrodes include hollowed-out portions extending along one lateral side of the regular quadrangular structure, and another part of the plurality of electrodes include hollowed-out portions extending along another adjacent lateral side of the regular quadrangular structure.

BRIEF DESCRIPTION OF THE DRAWINGS

In order to illustrate technical solutions according to embodiments of the present disclosure or in the related art more clearly, drawings for the description of the related art or the embodiments will be described briefly hereinafter. Apparently, the drawings described hereinafter are related to merely a portion of the embodiments of the present disclosure, and other drawings may be obtained by those skilled in the art based on those drawings without creative work.

REFERENCE NUMERALS

| | |
|---|---|
| 1 - driving electrode block; | 2 - sensing electrode block; |
| 3 - electrode; | 31 - non-hollowed-out portion; |
| 311 - body portion; | 312 - connecting portion; |
| 32 - hollowed-out portion; | 4 - gap. |

DETAILED DESCRIPTION

In order to make the objects, the features and the advantages of the present disclosure more apparent, embodiments of the technical solutions provided by the present disclosure will be described hereinafter in a clear and complete manner in conjunction with the drawings. Apparently, the following embodiments are merely a part of, rather than all of, the embodiments of the present disclosure, and based on these embodiments, a person skilled in the art may obtain other embodiments, which also fall within the scope of the present disclosure.

Figure 1:
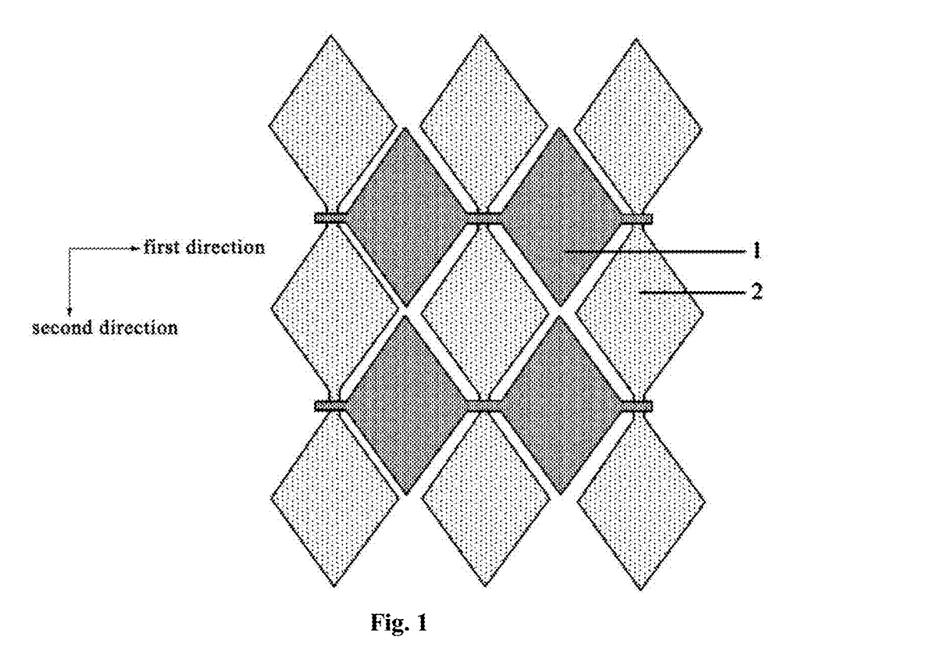
FIG. 1 is a structure diagram of a touch functional layer of a touch substrate in the related art.

As shown in FIG. 1, the electrode pattern of a common touch substrate in the related art includes a plurality of rows of driving electrode blocks 1 extended along a first direction and a plurality of columns of sensing electrode blocks 2 extended along the second direction. The driving electrode blocks 1 sequentially connected in each row form a driving line. The sensing electrode blocks 2 sequentially connected in each column form a sensing line. The driving line and the sensing line are electrically isolated at the overlap using an insulating layer. As shown in FIG. 1, the driving electrode blocks 1 and the sensing electrode blocks 2 in the same layer. By inputting a driving signal to the driving electrode blocks 1 in each row and acquiring a sensing signal from the sensing electrode blocks 2 in each column, a touch location coordinate may be determined.

Optionally, the touch substrate includes a plurality of electrodes. The plurality of electrodes include driving electrodes and sensing electrodes. The driving electrodes and the sensing electrodes may be stripe electrodes extended from one end of the touch substrate to the other end of the touch substrate respectively.

Optionally, the driving electrodes and the sensing electrodes extended in a same direction and without overlap. Optionally, the driving electrodes and the sensing electrodes extended in different direction and having overlap.

Optionally, the driving electrode includes a plurality of electrode blocks being connected to each other from one end of the touch substrate to the other end of the touch substrate. The electrodes blocks of the touch electrode and the electrode blocks of the sensing electrode are partially overlapped, or the stripe driving electrodes and the stripe sensing electrodes are partially overlapped, or the stripe diving/sensing electrodes and the electrode blocks of the sensing/driving electrodes are partially overlapped.

Figure 2:
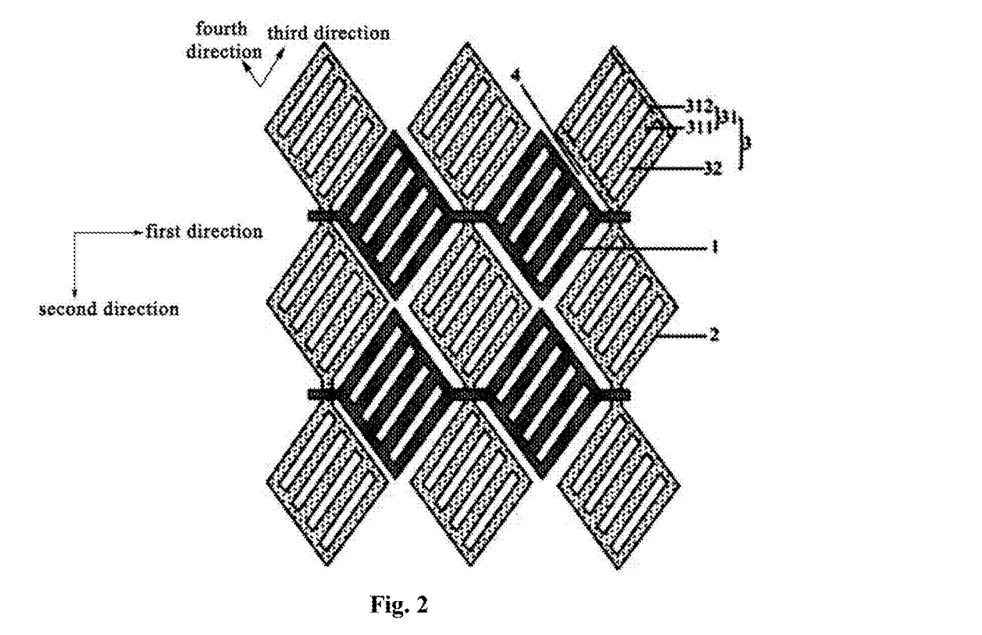
FIG. 2 is a first type of electrode pattern in a touch substrate provided by the present disclosure in at least one embodiment.
Figure 3:
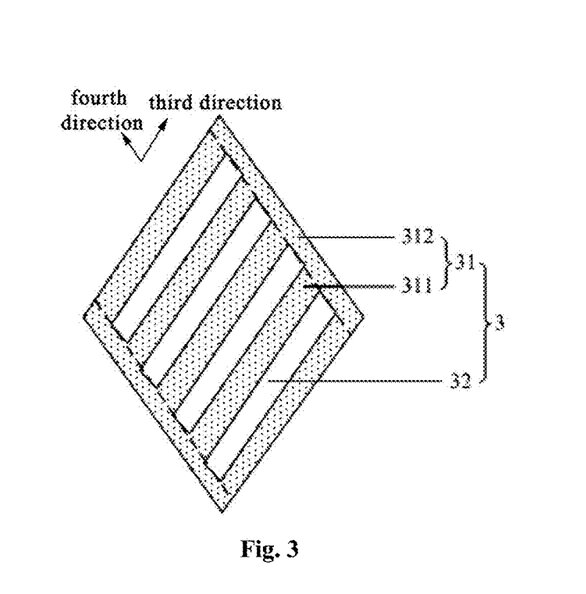
FIG. 3 is a schematic diagram of a first type of structure of a single electrode in the touch substrate provided by the present disclosure in at least one embodiment.
Figure 4:
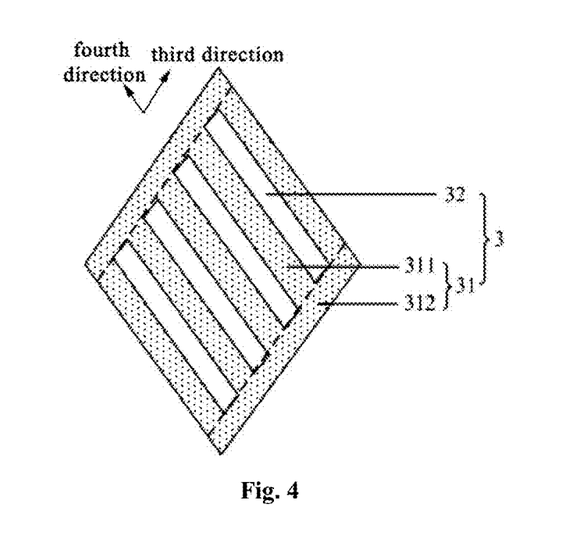
FIG. 4 is a schematic diagram of a second type of structure of the single electrode in the touch substrate provided by the present disclosure in at least one embodiment.

As shown in FIG. 2 to FIG. 4, the present disclosure provides a touch substrate in at least one embodiment. Electrode patterns are arranged in the touch substrate. The electrode patterns include a plurality of electrodes 3, and at least one of the electrodes 3 has a hollowed-out structure.

In the above-mentioned electrode patterns, at least one electrode 3 has the hollowed-out structure, regions to which the hollowed-out portions of the electrode correspond are not covered by a transparent conducting material, therefore the regions do not reflect light. That is, the reflecting region of one electrode includes non-reflecting regions. However, in the related art, a region to which one electrode corresponds is completely covered with a transparent conducting material capable of reflecting light, that is, the entire region to which one electrode corresponds reflects light. Compared with the related art, according to the present disclosure, the reflecting region of one electrode has non-reflecting regions, therefore a degree of visual difference caused by regions covered with the electrode patterns reflecting light and regions not covered with the electrode patterns not reflecting light is alleviated. Therefore, the user will not visually perceive apparent electrode patterns, thus improving the display effect and improving user's experience.

On the basis of the above technical solutions, optionally, each of the electrodes 3 of the touch screen may be configured to have a hollowed-out structure, such that the user's visual perception of apparent electrode patterns may be eliminated to a great extent, a uniformity and a consistency of electrode patterns on the touch screen are ensured, and a good touch effect is ensured.

According to the embodiments of the present disclosure, specific patterns of the electrodes having a hollowed-out structure may be designed based on practical requirements. Optionally, still referring to the FIG. 2 to FIG. 4, each of the electrodes 3 having the hollowed-out structure may include a non-hollowed-out portion 31 and a plurality of hollowed-out portions 32. The non-hollowed-out portion 31 includes a plurality of body portions 311.

In order to further alleviate the degree of visual difference caused by regions covered with the electrode patterns reflecting light and regions not covered with the electrode patterns not reflecting light, optionally, at least one hollowed-out portion 32 and at least a part of the body portions 311 in at least one electrode 3 having the hollowed-out structure may have a shape of extending in a third direction. Furthermore, optionally, the shape of the hollowed-out portions 32, the shape of the body portions 311 and the shape of a gap 4 between two adjacent electrodes in the third direction may be substantially the same. Furthermore, the size of the hollowed-out portions 32, the size of the body portions 311 and the size of the gap 4 between two adjacent electrodes in the third direction may be substantially the same.

Similarly, at least one of the hollowed-out portions 32 and at least a portion of the body portions 311 in at least one of the electrodes 3 having the hollowed-out structure may be arranged to extend in a fourth direction. Accordingly, the shape of hollowed-out portions 32, the shape of the body portions 311 and the shape of the gap 4 between two adjacent electrodes in the fourth direction may be substantially the same, and the size of the hollowed-out portions 32, the size of the body portions 311 and the size of the gap 4 between two adjacent electrodes in the third direction may be substantially the same.

Figure 5:
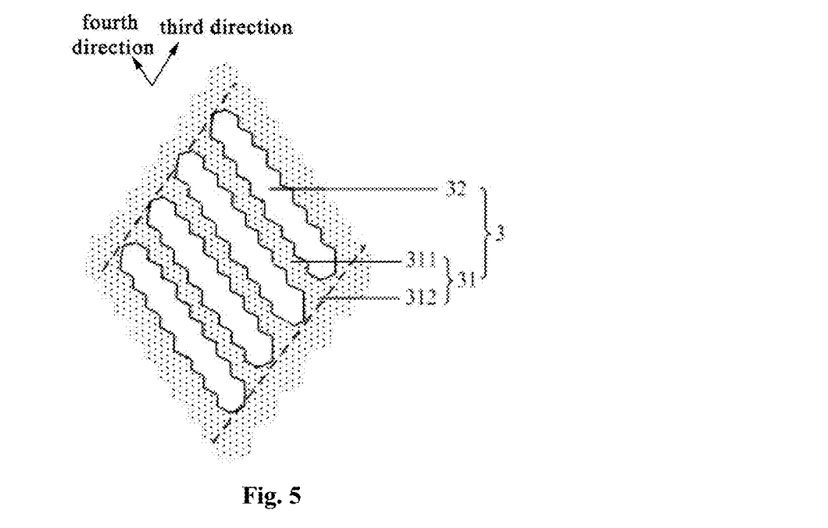
FIG. 5 is a schematic diagram of a third type of structure of the single electrode in the touch substrate provided by the present disclosure in at least one embodiment.

It should be noted that, the hollowed-out portions 32 and the body portions 311 being arranged to extend in the third direction refers to that shapes of the hollowed-out portions 32 and the body portions 311 extend a longer distance in the third direction than in other directions. For example, strip-shaped hollowed-out portions 32 and body portions 311 are arranged in the third direction, as shown in FIG. 2. Similarly, the shape of the hollowed-out portions 32 and the body portions 311 being arranged to extend in the fourth direction refers to that shapes of the hollowed-out portions 32 and the body portions 311 extend a longer distance in the fourth direction than in other directions. For example, strip-shaped hollowed-out portions 32 and body portions 311 are arranged in the fourth direction, as shown in FIG. 5.

For example, for the electrodes 3 having a rhombic shape as a whole, a gap between two adjacent rhombic electrodes 3 in the third direction or the fourth direction is strip-shaped. The shape of the hollowed-out portions 32, the shape of the body portions 311 and the shape of the gap 4 between two adjacent electrodes in the third direction being substantially the same refers to that profiles of the shapes of the above three components are substantially the same. For example, they all have a strip-shaped profile. It should be noted that, the shape of the hollowed-out portions 32 and the extending direction or arranging direction of the strip-shaped profile of the body portions 311 may be different from the extending direction or arranging direction of the strip-shaped profile of the gap 4 between two adjacent electrodes in the third direction. Furthermore, the widths and the lengths of the hollowed-out portions 32 and the body portion 311 are substantially the same to the width and the length of the strip-shaped gap. In this way, a distribution of regions covered with electrode patterns and regions not covered with electrode patterns in the whole touch substrate tends to be uniform, which further decreases the degree of visual difference caused by regions covered with electrode patterns reflecting light and regions not covered with electrode patterns not reflecting light.

In addition, uniformly arranging the plurality of hollowed-out portions 32 and the plurality of body portions 311 in the electrode 3 having the hollowed-out structure may also further alleviate the degree of visual difference caused by regions covered with electrode patterns reflecting light and regions not covered with electrode patterns not reflecting light.

As shown in FIG. 3 and FIG. 4, in order to ensure that electrodes 3 having the hollowed-out structure have a good conductivity, optionally, the non-hollowed-out portion 31 further includes a connecting portion 312 connecting the plurality of body portions 311 of the non-hollowed-out portion 31. The connection portion has a length similar with that of the body portion 311. The existence of the connecting portion 312 makes the body portions 311 electrically connected to each other, thus realizing the connection of the entire non-hollowed-out portion 31. Optionally, the plurality of body portions 311 and the plurality of hollowed-out portions 32 of the electrode 3 having the hollowed-out structure may be arranged by turns, such that the reflecting regions and the non-reflecting regions in one electrode appear by turns, thus further alleviating the degree of visual difference caused by regions covered with electrode patterns reflecting light and regions not covered with electrode patterns not reflecting light.

Still referring to FIG. 3 and FIG. 4, one electrode 3 having the hollowed-out structure may have two connecting portions 312, which are located at opposite ends of the body portion 311. Each of the connecting portions 312 and the plurality of body portions 311 of the electrode 3 form a comb structure as a whole, with the connecting portion 312 as the comb handle of the comb structure, and the plurality of body portions 311 as the comb teeth of the comb structure. On the basis of the above structure, exemplarily, in the event that the shape of the gap 4 between two adjacent electrodes is strip-shaped, the shape of the body portions 311 and the hollowed-out portions 32 of the electrode 3 may be strip-shaped, one end of each of the body portions 311 is connected to one of the connecting portions 312 of the electrode 3, the other end of each of the body portions 311 is connected to the other connecting portion 312 of the electrode 3, thus forming a comb structure.

Regarding the practical design of the electrode 3, the electrodes 3 and even the body portions 311 and the connecting portions 312 of the electrodes 3 having the hollowed-out structure are not necessarily of a regular shape, such as a regular quadrilateral shape, a strip shape. Sides of electrode 3, sides of the body portions 311 and the connecting portions 312 of the electrode 3 having the hollowed-out structure may be straight, polyline etc., as long as it is ensured that the shape and size of the hollowed-out portions 32 are substantially the same to the shape and size of the gap 4 between two adjacent electrodes, the degree of visual difference caused by regions covered with the electrode patterns reflecting light and regions not covered with the electrode patterns not reflecting light may be alleviated. Exemplarily, as shown in FIG. 5, sides of the electrodes 3 having the hollowed-out structure, sides of the body portions 311 and sides of the connecting portions 312 of the electrodes 3 having the hollowed-out structure are polylines such as wavy or zigzag lines. In this design, sides of the hollowed-out portions 32 and sides of the gap 4 between two adjacent electrodes 3 are also polylines such as wavy or zigzag lines, thus the shape of the hollowed-out portions 32 and the shape of the gap 4 between two adjacent electrodes are substantially the same.

Figure 9:
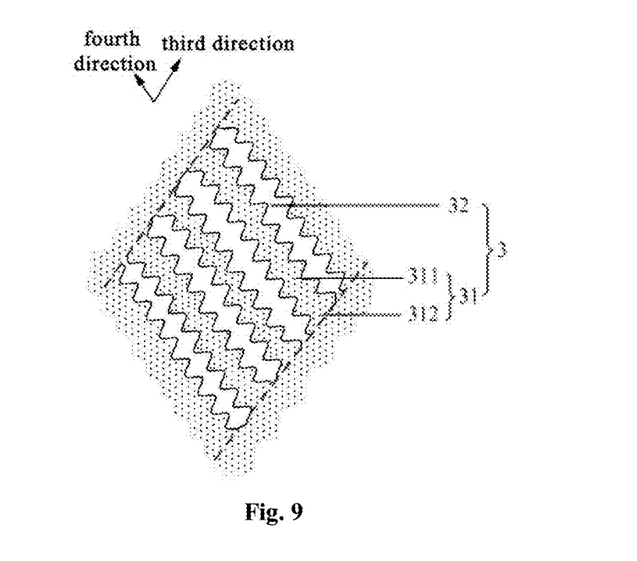
FIG. 9 is a schematic diagram of a five type of structure of the single electrode in the touch substrate provided by the present disclosure in at least one embodiment.

As shown in FIG. 9, sides of the electrodes 3 having the hollowed-out structure, sides of the body portions 311 and sides of the connecting portions 312 of the electrodes 3 having the hollowed-out structure are wavy lines. In this design, sides of the hollowed-out portions 32 and sides of the gap 4 between two adjacent electrodes 3 are also wavy lines, thus the shape of the hollowed-out portions 32 and the shape of the gap 4 between two adjacent electrodes are substantially the same.

Still referring to FIG. 3 and FIG. 4, in this embodiment, the plurality of electrodes of the touch substrate may have a quadrangular structure. A set of opposite sides of the quadrangular structure extends in the third direction, and a remaining set of opposite sides of the quadrangular structure extends in the fourth direction. The body portions 311 and the hollowed-out portions 32 of the electrodes 3 having the hollowed-out structure all extend in the third direction (as shown in FIG. 3) or the fourth direction (as shown in FIG. 4), such that the body portions 311, the hollowed-out portions 32 and the gap between two adjacent electrodes are more uniformly distributed, thus alleviating the degree of visual difference caused by regions covered with electrode patterns reflecting light and regions not covered with electrode patterns not reflecting light.

It should be noted that, with respect to the shapes of the plurality of electrodes of the touch substrate, FIG. 3 and FIG. 4 show a case in which the electrodes have a rhombic structure, and in other embodiments of the present disclosure, the electrodes may also have a rectangular structure, a square structure, etc. In addition, under a premise of the electrode having a quadrangular structure as a whole, sides of the electrodes are not necessarily straight, and may also be of a shape of other types of line, such as polyline.

On the basis of the structure of the above single electrode having the hollowed-out structure, the overall arrangement of the electrode patterns in the touch substrate may have numerous types. Usually, the plurality of electrodes of the touch substrate includes a plurality of driving electrode blocks 1 and a plurality of sensing electrode blocks 2, and the driving electrode blocks 1 and the sensing electrode blocks 2 are arranged by turns in the third direction and the fourth direction. The plurality of driving electrode blocks 1 is arranged in a plurality of rows, the driving electrode blocks 1 in each row are connected in concatenation to form a plurality of driving lines. The plurality of sensing electrode blocks 2 is arranged in a plurality of columns, sensing electrode blocks 2 in each column are connected in concatenation to form a plurality of sensing lines. At least one of the driving electrode blocks 1 has a hollowed-out structure and at least one of the sensing electrode blocks 2 has a hollowed-out structure to eliminate the user's visual perception of apparent electrode patterns. Furthermore, all driving electrode blocks 1 and all sensing electrode blocks 2 may be provided as having a hollowed-out structure to eliminate user's visual perception of electrode patterns to a great extent.

Exemplarily, as shown in FIG. 2, the body portions 311 and the hollowed-out portions 32 of the driving electrode blocks 1 having the hollowed-out structure extend in the third direction, and the body portions 311 and the hollowed-out portions 32 of the sensing electrode blocks 2 having the hollowed-out structure extend in the third direction.

Figure 6:
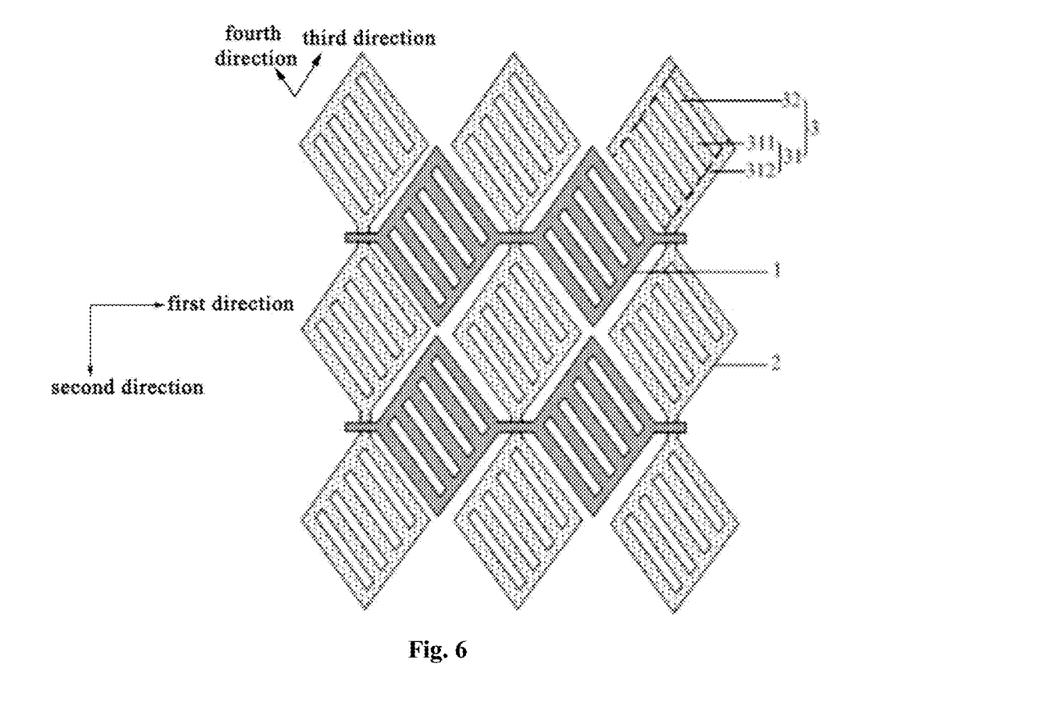
FIG. 6 is a second type of electrode pattern in the touch substrate provided by the present disclosure in at least one embodiment.

Exemplarily, as shown in FIG. 6, the plurality of electrodes comprises touch driving electrodes extended along a first direction and touch sensing electrodes extended along a second direction intersecting with the first direction, the body portions 311 and the hollowed-out portions 32 of the driving electrode blocks 1 having the hollowed-out structure extend in the fourth direction, and the body portions 311 and the hollowed-out portions 32 of the sensing electrode blocks 2 having the hollowed-out structure extend in the fourth direction.

Figure 7:
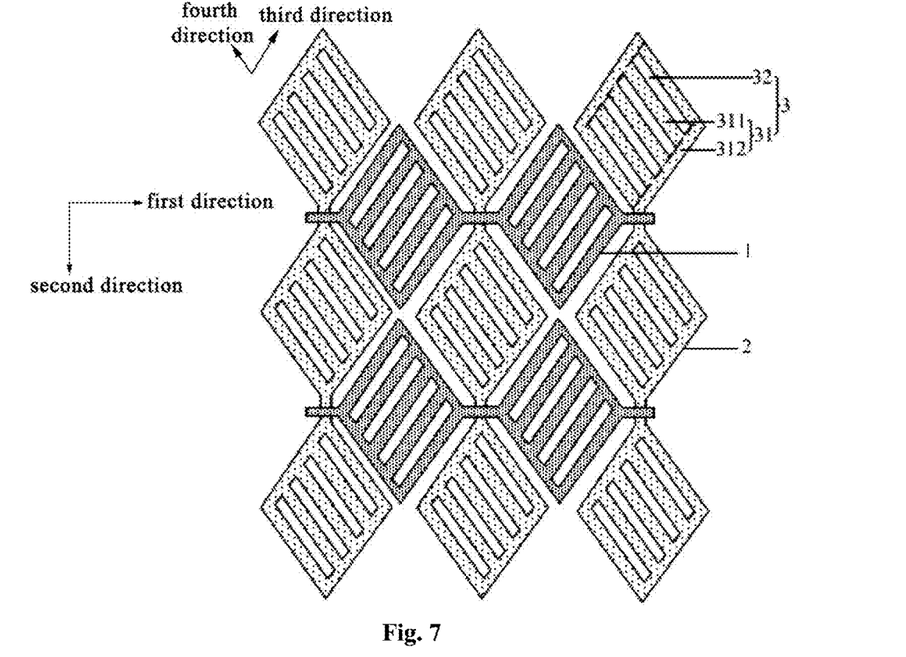
FIG. 7 is a third type of electrode pattern in the touch substrate provided by the present disclosure in at least one embodiment.

Exemplarily, as shown in FIG. 7, the plurality of electrodes comprises touch driving electrodes extended along a first direction and touch sensing electrodes extended along a second direction intersecting with the first direction, the body portions 311 and the hollowed-out portions 32 of the driving electrode blocks 1 having the hollowed-out structure extend in the third direction, and the body portions 311 and the hollowed-out portions 32 of the sensing electrode blocks 2 having the hollowed-out structure extend in the fourth direction. An angle between the third direction and the first direction is more than zero degree; and an angle between the fourth direction and the first direction is more than zero degree. The third direction and the fourth direction are different and the angle between the third direction and the first direction and the angle between the fourth direction and the first direction are substantially the same degree.

In the present disclosure, a substantially same degree/shape/size/length/width refers to that a difference therebetween is within a range understood by a person skilled in the art.

Figure 8:
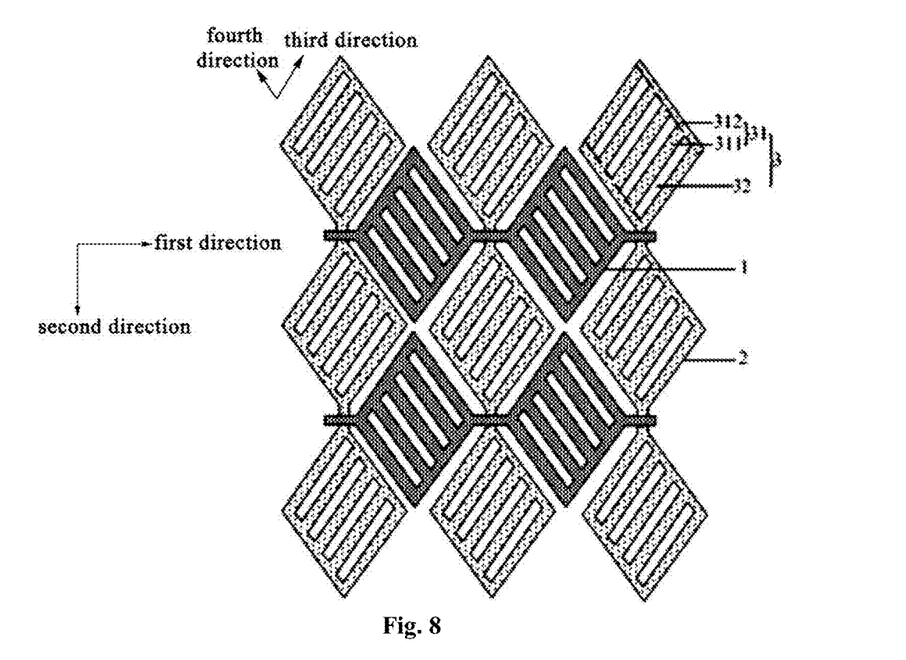
FIG. 8 is a fourth type of electrode pattern in the touch substrate provided by the present disclosure in at least one embodiment.

Exemplarily, as shown in FIG. 8, the body portions 311 and the hollowed-out portions 32 of the driving electrode blocks 1 having the hollowed-out structure extend in the fourth direction, the body portions 311 and the hollowed-out portions 32 of the sensing electrode blocks 2 having the hollowed-out structure extend in the third direction. An angle between the third direction and the first direction is more than zero degree; and an angle between the fourth direction and the first direction is more than zero degree.

Figure 10:
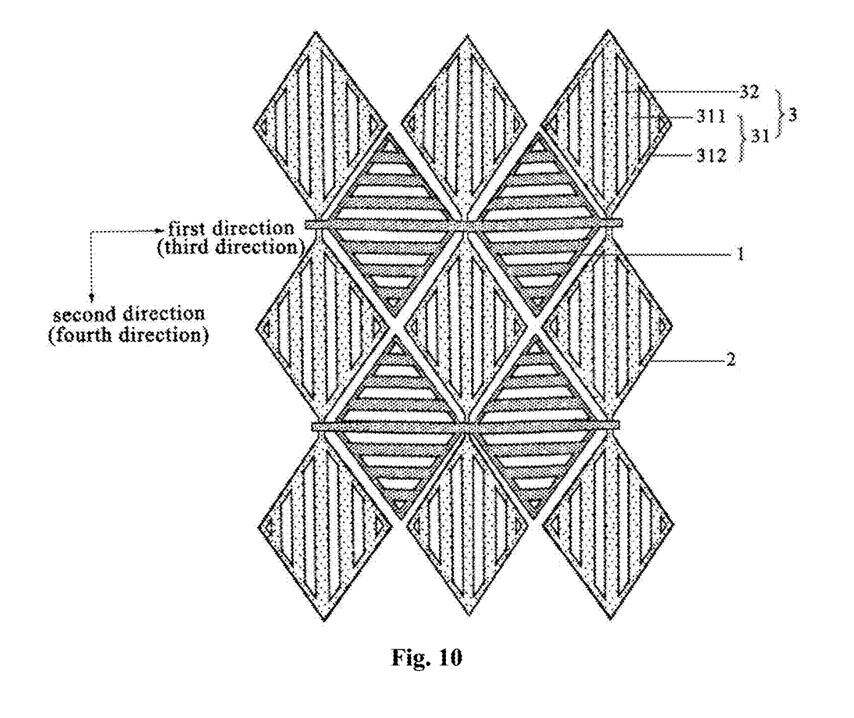
FIG. 10 is a sixth type of electrode pattern in the touch substrate provided by the present disclosure in at least one embodiment.

Exemplarily, as shown in FIG. 10, the plurality of electrodes 3 comprises touch driving electrodes 1 extended along a first direction and touch sensing electrodes 2 extended along a second direction intersecting with the first direction. The body portions 311 and hollowed-out portions 32 in the touch driving electrodes 1 are extended along the first direction; and body portions 311 and hollowed-out portions 32 in the touch sensing electrodes 2 are extended along the second direction.

In addition, in the event that the plurality of driving electrode blocks 1 each has a hollowed-out structure, body portions 311 and hollowed-out portions 32 of a part of the driving electrode blocks 1 having the hollowed-out structure may be arranged to extend in the third direction, and the body portions 311 and the hollowed-out portions 32 of the remaining driving electrode blocks 1 having the hollowed-out structure may be arranged to extend in the fourth direction.

In the event that a plurality of sensing electrode blocks 2 each has a hollowed-out structure, body portions 311 and hollowed-out portions 32 of a part of the sensing electrode blocks 2 having the hollowed-out structure may be arranged to extend in the third direction, and body portions 311 and hollowed-out portions 32 of remaining sensing electrode blocks 2 having the hollowed-out structure may be arranged to extend in the fourth direction.

In the above electrodes 3 having the hollowed-out structure, optionally, an area of the body portion 311 and an area of the hollowed-out portion 32 may be the same, thus further eliminating the user's visual perception of apparent electrode patterns.

It should be noted that, the present disclosure introduces in at least one embodiment a solution in which the hollowed-out portions 32 of the electrodes 3 having the hollowed-out structure are strip-shaped, but in the touch substrate provided by the embodiment, the shape of the hollowed-out portions 32 of the electrodes 3 having the hollowed-out structure may also be of other shapes, such as a circular shape, an elliptic shape, a square shape or a rhombic shape.

Embodiments of the present disclosure further provide a touch display device, including the touch substrate provided by the present disclosure in at least one embodiment. Since the touch substrate provided by the present disclosure in at least one embodiment decreases the degree of visual difference caused by regions covered with the electrode patterns reflecting light and regions not covered with the electrode patterns not reflecting light, such that the user will not visually perceive apparent electrode patterns. Therefore, the touch display device including the touch substrate has a good display effect, and the user's experience is good.

It should be noted that, the touch display device provided by the present disclosure in at least one embodiment may be any products or components having a display function, such as a liquid crystal panel, an electronic paper, an organic light-emitting diode (OLED) panel, a mobile phone, a tablet PC, a TV, a display, a notebook computer, a digital photo frame, and a navigator.

The above are merely some specific embodiments of the present disclosure and shall not be used to limit the scope of the present disclosure. A person skilled in the art may readily envisage modifications and replacements without departing from the scope disclosed by the present disclosure, and these modifications and replacements shall also fall within the scope of the present disclosure. The scope of the present disclosure should be limited by the attached claims.

What is claimed is:

1. A touch substrate, comprising a plurality of electrodes, at least one of the plurality of electrodes including a plurality of hollowed-out structures and a plurality of body portions arranged alternately, wherein
    each of the plurality of hollowed-out structures has a substantially same shape and size as each of the plurality of body portions, the plurality of body portions includes a plurality of first ends and a plurality of second ends,
    the plurality of electrodes comprises touch driving electrodes extended along a first direction, touch sensing electrodes extended along a second direction intersecting with the first direction, a plurality of first connection portions, a plurality of second connection portions, a plurality of third connection portions, and a plurality of fourth connection portions,
    the first connection portion connects the first ends of the plurality of body portions of the touch driving electrode, the second connection portion connects the second ends of the plurality of body portions of the touch driving electrode,
    the third connection portion connects the first ends of the plurality of body portions of the touch sensing electrode, the fourth connection portion connects the second ends of the plurality of body portions of the touch sensing electrode, and
    body portions and hollowed-out portions in the touch driving electrodes are extended along a fourth direction, an angle between the fourth direction and the first direction is more than zero degree; and
    body portions and hollowed-out portions in the touch sensing electrodes are extended along a third direction, an angle between the fourth direction and the first direction is more than zero degree, and
    the first connection portion and the second connection portion are extended along the third direction, the third connection portion and the fourth connection portion are extended along the fourth direction.

2. The touch substrate according to claim 1, wherein the plurality of hollowed-out structures and the plurality of body portions have a shape including polylines.

3. The touch substrate according to claim 2, wherein the plurality of hollowed-out structures and the plurality of body portions are extended along a same direction, the plurality of hollowed-out structures and the plurality of body portions have substantially a same length and width.

4. The touch substrate according to claim 2, wherein
    the first connection portion and the second connection portion are straight lines or polylines.

5. The touch substrate according to claim 2, wherein the plurality of body portions and the plurality of hollowed-out portions have a wavy or zigzag shape.

6. The touch substrate according to claim 1, wherein the plurality of hollowed-out structures and the plurality of body portions are extended along a same direction, each of the plurality of hollowed-out structures has a substantially same length and width as each of the plurality of body portions.

7. The touch substrate according to claim 1, wherein
    the first connection portion and the second connection portion are straight lines or polylines.

8. The touch substrate according to claim 1, wherein
    the third direction and the fourth direction are the same.

9. The touch substrate according to claim 1, wherein
    the third direction and the fourth direction are different and the angle between the third direction and the first direction and the angle between the fourth direction and the first direction are substantially a same degree.

10. A touch display device, comprising a display panel and the touch substrate according to claim 1.

11. The touch substrate according to claim 1, wherein,
    each of the plurality of electrodes is of a regular quadrangular structure, the hollowed-out structure includes a plurality of hollowed-out portions each being of a stripe shape and extending along a lateral side of the regular quadrangular structure,
    hollowed-out portions in each electrode extend along a same lateral side of the regular quadrangular structure; and
    a part of the plurality of electrodes include hollowed-out portions extending along one lateral side of the regular quadrangular structure, and another part of the plurality of electrodes include hollowed-out portions extending along another adjacent lateral side of the regular quadrangular structure.

* * * * *

UNITED STATES PATENT AND TRADEMARK OFFICE
CERTIFICATE OF CORRECTION

PATENT NO. : 10,976,883 B2
APPLICATION NO. : 16/561653
DATED : April 13, 2021
INVENTOR(S) : Benlian Wang It is certified that error appears in the above-identified patent and that said Letters Patent is hereby corrected as shown below:

On the Title Page

Item (73), Delete:
"(73) Assignees: CHENGDU BOE OPTELECTRONICS TECHNOLOGY CO., LTD., Chengdu (CN); BOE TECHNOLOGY GROUP CO., LTD., Beijing (CN)"

And Insert:
--(73) Assignees: CHENGDU BOE OPTOELECTRONICS TECHNOLOGY CO., LTD., Chengdu (CN); BOE TECHNOLOGY GROUP CO., LTD., Beijing (CN)--.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*